US008692151B2

(12) United States Patent  
Tertitski et al.

(10) Patent No.: US 8,692,151 B2  
(45) Date of Patent: Apr. 8, 2014

(54) LASER BEAM POSITIONING SYSTEM

(75) Inventors: Leonid M. Tertitski, Los Gatos, CA (US); Krishna Kumar Kuttannair, San Jose, CA (US); Aaron Muir Hunter, Santa Cruz, CA (US); Stephen Moffatt, St. Brelade (JE)

(73) Assignee: Applied Materials, Inc., Santa Clara, CA (US)

( * ) Notice: Subject to any disclaimer, the term of this patent is extended or adjusted under 35 U.S.C. 154(b) by 171 days.

(21) Appl. No.: 13/076,231

(22) Filed: Mar. 30, 2011

(65) Prior Publication Data

US 2011/0239421 A1    Oct. 6, 2011

Related U.S. Application Data

(60) Provisional application No. 61/319,777, filed on Mar. 31, 2010.

(51) Int. Cl.  
*H01L 21/00* (2006.01)

(52) U.S. Cl.  
USPC ............... 219/121.6; 219/121.78; 219/121.74

(58) Field of Classification Search  
USPC .................... 219/121.6, 390, 725, 729, 50.1; 118/725, 729, 50.1; 438/795, 796, 797  
See application file for complete search history.

(56) References Cited

U.S. PATENT DOCUMENTS

| | | | | | |
|---|---|---|---|---|---|
| 3,252,490 | A | * | 5/1966 | Belk | 99/538 |
| 4,030,830 | A | * | 6/1977 | Holly | 356/489 |
| 4,629,319 | A | * | 12/1986 | Clarke et al. | 356/237.2 |
| 4,704,510 | A | * | 11/1987 | Matsui | 219/728 |
| 4,806,728 | A | * | 2/1989 | Salzer et al. | 219/121.63 |
| 4,920,385 | A | * | 4/1990 | Clarke et al. | 356/237.2 |
| 5,035,476 | A | * | 7/1991 | Ellis et al. | 359/202.1 |
| 5,089,683 | A | * | 2/1992 | Stephenson et al. | 219/121.78 |
| 5,237,151 | A | * | 8/1993 | Maruyama | 219/121.78 |
| 5,352,405 | A | * | 10/1994 | Beaman et al. | 419/45 |
| 5,939,704 | A | * | 8/1999 | Perrie et al. | 250/201.1 |
| 6,003,997 | A | * | 12/1999 | Downes, Jr. | 359/857 |
| 6,034,804 | A | * | 3/2000 | Bashkansky et al. | 359/201.1 |
| 6,130,401 | A | * | 10/2000 | Yoo et al. | 219/121.6 |
| 6,586,706 | B2 | * | 7/2003 | Erlenmaier et al. | 219/121.67 |
| 6,706,998 | B2 | * | 3/2004 | Cutler | 219/121.72 |
| 6,813,050 | B2 | * | 11/2004 | Chen et al. | 359/212.2 |
| 6,816,294 | B2 | * | 11/2004 | Unrath et al. | 359/225.1 |
| 6,998,572 | B2 | * | 2/2006 | Endo et al. | 219/121.85 |
| 7,109,435 | B2 | * | 9/2006 | Tsukihara et al. | 219/121.65 |
| 7,238,914 | B2 | * | 7/2007 | Kawakita et al. | 219/121.78 |
| 7,245,412 | B2 | * | 7/2007 | Bruland et al. | 359/225.1 |
| 7,459,655 | B2 | * | 12/2008 | Nomaru | 219/121.78 |
| 7,547,866 | B2 | * | 6/2009 | Tanaka et al. | 250/201.2 |

(Continued)

*Primary Examiner* — Dana Ross  
*Assistant Examiner* — Jimmy Chou  
(74) *Attorney, Agent, or Firm* — Patterson & Sheridan, LLP

(57) ABSTRACT

A method and apparatus for targeting a beam of radiation is provided. A beam steering mirror and a beam capture mirror are movably disposed along an optical pathway. A controller moves the beam steering mirror and the beam capture mirror in an x-y plane, and rotates the mirrors, to target the beam to a target location on a surface, while keeping the optical path length substantially constant for all target locations on the surface. The surface is rotated by a rotational actuator to bring all target locations to positions accessible by the beam targeting optics. Imprecision in targeting and optical path length may be compensated by providing an actuated aperture at the beam entry point and/or a variable focus lens with an optical range finding detector, all in communication with the controller.

13 Claims, 5 Drawing Sheets

(56) References Cited

U.S. PATENT DOCUMENTS

| | | | |
|---|---|---|---|
| 8,222,570 B2 * | 7/2012 | Timans | 219/390 |
| 8,294,062 B2 * | 10/2012 | Sukhman et al. | 219/121.74 |
| 2002/0049511 A1 * | 4/2002 | Brandinger et al. | 700/166 |
| 2003/0102293 A1 * | 6/2003 | Therond | 219/121.78 |
| 2003/0151053 A1 * | 8/2003 | Sun et al. | 257/79 |
| 2004/0251243 A1 * | 12/2004 | Lizotte et al. | 219/121.73 |
| 2005/0218124 A1 * | 10/2005 | Jennings et al. | 219/121.65 |
| 2005/0224469 A1 * | 10/2005 | Cutler et al. | 219/121.6 |
| 2005/0279736 A1 * | 12/2005 | Bruland et al. | 219/121.8 |
| 2006/0076346 A1 * | 4/2006 | Bedingham et al. | 219/725 |
| 2006/0102901 A1 * | 5/2006 | Im et al. | 257/64 |
| 2009/0032511 A1 * | 2/2009 | Adams et al. | 219/121.75 |
| 2009/0035891 A1 * | 2/2009 | Kim | 438/108 |
| 2009/0091817 A1 * | 4/2009 | Jennings et al. | 359/298 |
| 2009/0266804 A1 * | 10/2009 | Costin et al. | 219/121.85 |
| 2010/0065547 A1 * | 3/2010 | Moffatt et al. | 219/475 |
| 2010/0068898 A1 * | 3/2010 | Moffatt et al. | 438/799 |
| 2010/0093112 A1 * | 4/2010 | Takagi et al. | 438/7 |
| 2010/0140237 A1 * | 6/2010 | Unrath | 219/121.72 |
| 2010/0206854 A1 * | 8/2010 | Nakai et al. | 219/121.6 |
| 2011/0017756 A1 * | 1/2011 | Finell | 220/732 |
| 2011/0094918 A1 * | 4/2011 | Hernandez | 206/521.15 |

* cited by examiner

LASER BEAM POSITIONING SYSTEM

CROSS-REFERENCE TO RELATED APPLICATIONS

This application claims benefit of U.S. Provisional Patent Application Ser. No. 61/319,777 filed Mar. 31, 2010, and incorporated herein by reference in its entirety.

BACKGROUND OF THE INVENTION

1. Field of the Invention

Embodiments described herein relate to thermal processing of semiconductor substrates. More specifically, embodiments described herein relate to methods and apparatus for laser thermal annealing of semiconductor substrates.

2. Description of the Related Art

Laser thermal processing is a commonly used technique in the semiconductor industry. Semiconductor substrates are subjected to laser thermal treatment for various recrystallization, activation, and annealing processes related to integrated circuits, large area panels such as flat-panel displays and solar panels, photonic media, and magnetic media. Laser processing is frequently selected for large heating rates achievable with laser means, and the rapid throughput available.

In most instances, a substrate to be processed is positioned on a support in a laser apparatus, and the laser is focused to a spot on the substrate. The substrate is then moved to position the laser spot at successive locations on the substrate until all desired locations on the substrate are processed. Positioning is normally accomplished using a precision x-y stage for supporting the substrate. The substrate may also be moved in a z-direction to maintain focus of the laser spot on the substrate.

As the size of devices on semiconductor substrates declines with Moore's Law, the need for accurate control of positioning and focus increases. Imprecision in positioning the laser may result in devices desirous of thermal processing being missed, while other locations not desirous of thermal processing are irradiated. In addition, uniform treatment becomes increasingly difficult as imprecision in focus of the radiation becomes larger relative to device size. These trends rapidly increase the difficulty of accurately positioning the stage in the x, y, and z-directions. Thus, there is a continuing need for thermal processing apparatus and methods that yield improved precision of location and focus.

SUMMARY OF THE INVENTION

Embodiments disclosed herein provide an apparatus for thermally treating a semiconductor substrate, the apparatus having a process chamber, a rotatable substrate support disposed in the process chamber, a light source capable of producing a beam of light having substantially uniform intensity coupled to the process chamber at a beam entry point, a constant optical path length beam location assembly disposed in the chamber in optical communication with the beam entry point, the constant optical path length beam location assembly having a plurality of movable optical components, and a controller coupled to the substrate support and the constant optical path length beam location assembly, the controller configured to position the optical components of the beam location assembly and a selected portion of a substrate on the substrate support such that the beam illuminates the selected portion and the optical path length for the beam is substantially the same for all portions of the substrate.

Other embodiments provide a beam location apparatus for a laser annealing chamber, the beam location apparatus having a beam targeting optical assembly, a beam targeting detector, and a controller configured to sequentially target a beam of laser radiation to a plurality of locations with a substantially constant optical path length.

Other embodiments provide a method of targeting a beam of laser radiation at a location on a surface, including staging the target location by rotating the surface to an accessible orientation, locating a beam capture mirror over the target location, determining a reflection point of a beam steering mirror such that the optical path length of the beam reflecting from the beam steering mirror and the beam capture mirror to the surface is substantially equal to a target optical path length, moving the beam steering mirror to the reflection point, rotating the beam steering mirror to direct the beam to the beam capture mirror, and rotating the beam capture mirror to direct the beam to the target location.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1A:
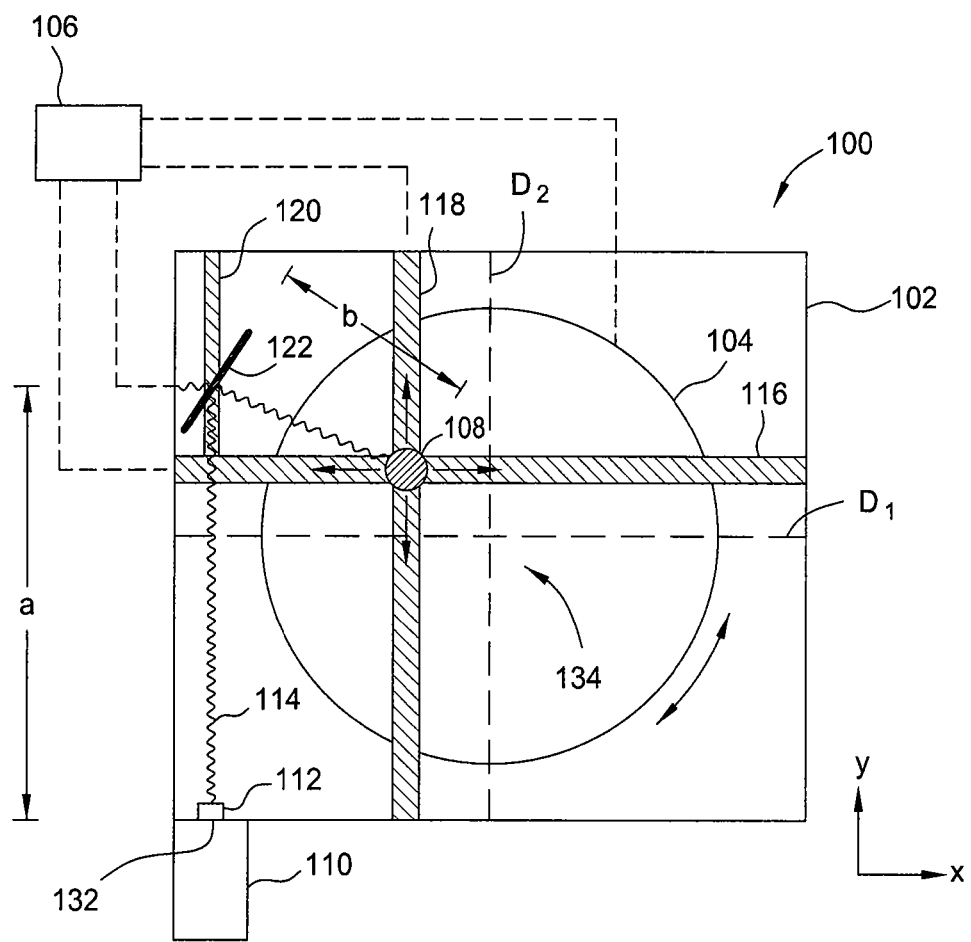
FIG. 1A is a schematic top view of a thermal processing apparatus according to one embodiment.

Embodiments described herein generally provide an apparatus for thermally treating a semiconductor substrate. FIG. 1A is a schematic top view of a thermal processing apparatus 100 according to one embodiment. The thermal processing apparatus 100, which may be a laser annealing chamber, comprises a process chamber 102 and a rotatable substrate support 104 disposed in the process chamber 102. A radiation source 110 is coupled to the process chamber 102 at a beam entry point 132. The radiation source 110 features an optical element 112 that is a final optical element of the radiation source 110. The final optical element 112 of the radiation source 110 releases a beam of laser radiation 114 into the chamber 102.

The beam 114 is generally shaped by the radiation source 110 to have an intensity profile that is uniform across a cross-section of the beam 114. In one embodiment, the beam 114 has an intensity profile with uniformity of about 2% or less. An example of a radiation source which may be used to generate a radiation beam useable in the embodiments disclosed herein is described in United States Patent Publication No. 2009/0032511, published Feb. 5, 2009, and incorporated herein by reference. The beam 114 may also be shaped into an image that has a certain outline when projected on a surface. In one embodiment, the beam 114 may have a circular cross-sectional shape. In other embodiments, the beam 114 may have a cross-sectional shape that is square, rectangular, or oval. The cross-sectional shape of the beam 114 may be generated by including an aperture having the desired shape in the final optical element 112 of the radiation source 110.

The apparatus 100 further comprises a beam location assembly 134 disposed in the chamber in optical communication with the beam entry point 132. The beam location assembly 134 targets the radiation beam 114 to a target location on a substrate disposed on the rotatable substrate support 104. The beam location assembly 134, which may be a beam targeting optical assembly, comprises a plurality of movable optical components. In the embodiment of FIG. 1A, the beam location assembly 134 comprises a beam capture mirror 108 and a beam steering mirror 122, both of which are actuated to direct the radiation beam 114 onto selected locations of a substrate disposed on the rotatable substrate support 104.

The beam steering mirror 122 is movable along a first y-guide 120 in the y-direction by a linear actuator (not visible in the view of FIG. 1A), such that a distance "a" between the beam steering mirror 122 and the beam entry point 132 varies. The beam capture mirror 108 is movable in the x- and y-direction along an x-guide 116 and a second y-guide 118. In one embodiment, the substrate support 104 rotates to enable limiting the x/y motion of the beam capture mirror 108 to one side of the diameter $D_2$. Also, the y-direction motion of the beam steering mirror 122 along the first y-guide 120 may be limited to one side of the diameter $D_1$. As the mirrors 108 and 122 are moved along their respective linear guides 116, 118, and 120, a distance "b" between the two mirrors changes. The distance "a" and "b" define a portion of the optical path length that the beam of radiation 114 travels from the beam entry point to the target location. Although FIGS. 1A and 1B illustrate flat, planar mirrors, curved mirrors such as parabolic, spheric, ellipsoidal, or cylindrical mirrors may be used.

The beam location assembly 134 is generally configured as a constant path length beam location assembly. As such, the mirrors 108 and 122 of the beam location assembly 134 are controlled by a controller 106 coupled to the linear actuators of the mirrors 108 and 122. The controller 106 moves the mirrors 108 and 122, and rotates the substrate support 104, to position the beam of radiation 114 at a target location while maintaining a constant optical path length for the radiation beam 114. The constant path length is useful for maintaining cross-sectional area and intensity profile of the radiation beam 114. Variation of the path length from exposure to exposure may result in non-uniform treatment from die to die or at different locations of a single die.

The radiation source 110 may be a continuous wave or pulsed laser or a plurality of continuous wave or pulsed lasers. The radiation source 110 may blend, shape, or combine output of multiple lasers in any convenient way, for example by generating pulses from multiple lasers with desired frequency and phase difference, and blending the pulses using pulse-stretching optics to produce energy pulses of arbitrary shape and temporal energy profile. The radiation source 110 may additionally include polarizing optics. In operation in a laser thermal annealing apparatus, the radiation beam 114 may be scanned across the surface of a substrate by continuous motion of the mirrors 108/122, or the mirrors may be stationary while the beam 114 irradiates the substrate, and moved when the beam 114 is shut off in a stepping process, or any combination thereof.

Figure 1B:
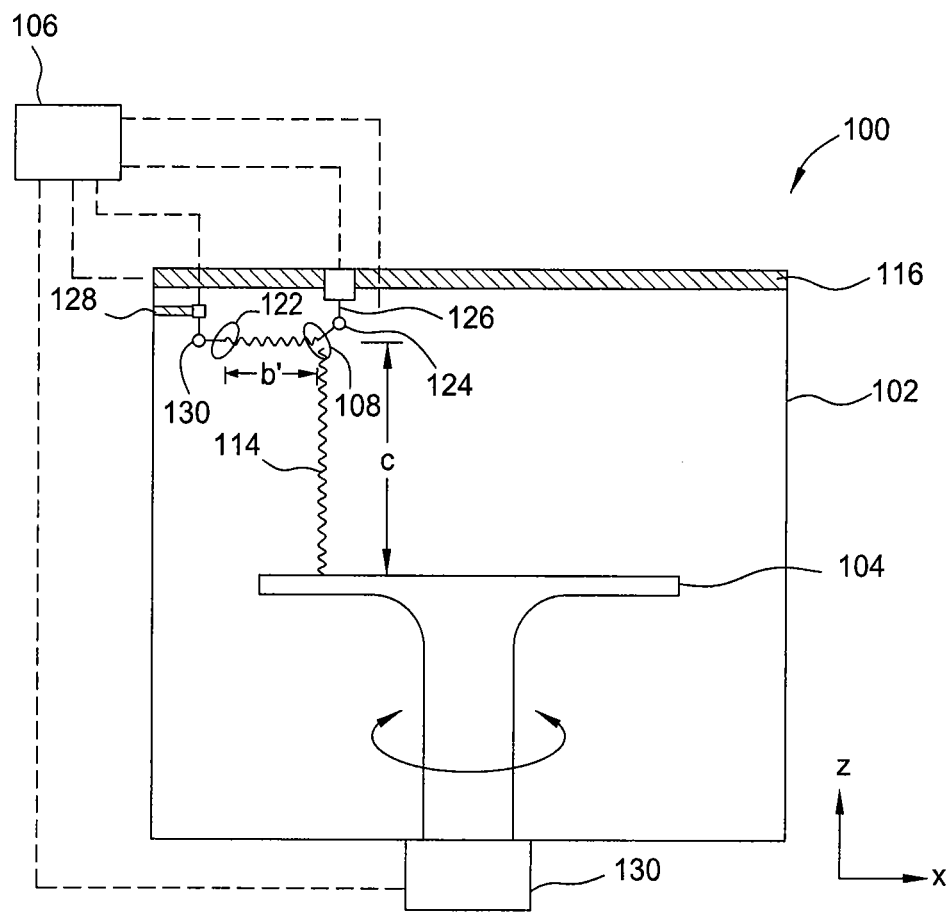
FIG. 1B is a schematic side-view of the thermal processing apparatus of FIG. 1A.

FIG. 1B is a schematic side view of the apparatus 100 of FIG. 1A. In the view of FIG. 1B, the apparatus 100 is viewed along the y-direction. A rotational actuator 130, in communication with the controller 106, is coupled to the substrate support 104 to provide rotation. The first y-guide 120 of FIG. 1A is supported by a support 128, which may be a rail or rod, and may include an actuator for the first y-guide 120. The beam capture mirror 108 is supported from the linear guides 116 and 118 by a rotational support 126 that has a rotational actuator 124 in communication with the controller 106. The actuator 124 rotates the beam capture mirror 108 to face the beam steering mirror 122 at an angle appropriate to direct the beam 114 toward the target location. The beam steering mirror 122 is likewise supported from its linear guide (not visible in the view of FIG. 1B) by a similar rotational support with a second rotational actuator 130 in communication with the controller 106.

The rotational actuators 124 and 130 may rotate the mirrors 122 and 108 about one, two, or three axes depending on the degrees of freedom required by the particular embodiment. For example, in an embodiment such as the embodiment of FIGS. 1A and 1B wherein the beam capture mirror moves in the x-y plane, each of the mirrors 122 and 108 may be confined to rotate about an axis perpendicular to the x-y plane, parallel to the z-direction, the axis of rotation for the beam capture mirror 108 running through a central portion of the beam capture mirror 108, such as the center or centroid of the beam capture mirror 108, and the axis of rotation for the beam steering mirror 122 running along a diameter of the beam steering mirror 122, such that the beam steering mirror 122 is oriented along the z-direction. In such an embodiment, the two mirrors 108 and 122 rotate together such that they are always in optical communication to direct the beam 114 to all target locations on one side of the diameter $D_2$ (FIG. 1A), after which the substrate support 104 may be rotated 180 degrees to allow access to all other target locations on a substrate.

Such an embodiment may be useful when the substrate has dies that are not oriented along radii of the substrate. For example, a silicon wafer may have rectangular dies oriented in a rectilinear grid across the surface of the wafer. If the rectangular dies are to be processed using a rectangular laser spot, it is generally desired that the orientation of the laser spot align with the orientation of the dies. Rotating the substrate support 104 any angular distance that is not a multiple of 180 degrees changes the orientation of the dies with respect to the orientation of the laser spot. Thus, an embodiment of a beam location assembly that enables processing of all dies on one side of the diameter $D_2$ may be useful for such processes.

In an embodiment wherein the laser spot has no particular orientation, such as a laser spot having a circular cross-section, the degrees of freedom of the mirrors 122 and 108 may be further constrained, for example by constraining the beam capture mirror 108 to move with the beam steering mirror 122 in the y-direction. Constant path length of the beam 114 may be maintained in such an embodiment by rotating the substrate support 104 by a determined amount for each target location to be processed. In such an embodiment, portions of a substrate not desirous of thermal processing may be exposed to annealing radiation from the laser spot due to mismatch between the profile of the laser spot and the shape of the target location. Masking the substrate, for example with a high emissivity coating, may protect such locations on the substrate.

Alternately, the radiation source may include a rotatable aperture, for example included in the final optical element 112 of the radiation source 110, to yield an oriented laser spot, for example a rectangular laser spot, that is rotatable to follow the rotation in orientation of the target location. The controller 106 may communicate with the rotatable aperture through a rotational actuator. An aperture that shapes the beam 114 emerging from the radiation source 110 generally comprises a thermally stable or refractory material, such as ceramic, to withstand prolonged and/or repeated irradiation. The surface of the aperture facing the interior of the radiation source 110 will generally be subjected to prolonged and/or repeated irradiation by the laser or plurality of lasers housed in the radiation source. Thus, either the interior surface of the aperture, or the entire aperture, will comprise a thermally resistant or refractory material. In some embodiments, thermal effects of the radiation incident on the interior surface of the aperture may be mitigated by scattering the radiation from a roughened surface or by coating the surface with a reflective or high-emissivity material. In other embodiments, the rotatable aperture may be cooled by forming channels for a cooling fluid through portions of the aperture.

The distance from the beam steering mirror 122 to the beam capture mirror 108, projected onto the x-z plane in the view of FIG. 1B, is denoted "b". The distance "c" from the beam capture mirror 108, when added to the distance "a" from the beam entry point 132 to the beam steering mirror 122, and the distance "b" from the beam steering mirror 122 to the beam capture mirror 108, is the optical path length of the beam 114 inside the chamber. The controller 106 adjusts the position of each mirror 108/122 along the respective linear guides 116/118/120, the rotation of each mirror 108/122, and the angular orientation of the substrate support 104, if necessary, to maintain the sum of a+b+c substantially constant. Maintaining a substantially constant optical path length preserves a uniform intensity profile of the beam 114, enhancing uniformity of treatment across a single target location and among all the target locations.

In an embodiment in which the mirrors 108/122 move together in the y-direction, the beam capture mirror 108 moves in the x-direction to compensate the distance "a" from the beam entry point to the beam steering mirror 122. In this embodiment, rotating the mirrors is not required, and the target location moves along a radius of the substrate support at a 45° angle to the x-axis of the apparatus. To reach all possible target locations of a substrate on the substrate support, the support is rotated to bring target locations along the beam access line. In such cases, rotating the substrate support may rotate orientation of target locations, so a non-oriented beam is used, or a rotatable aperture is used to adjust beam orientation.

Figure 2:
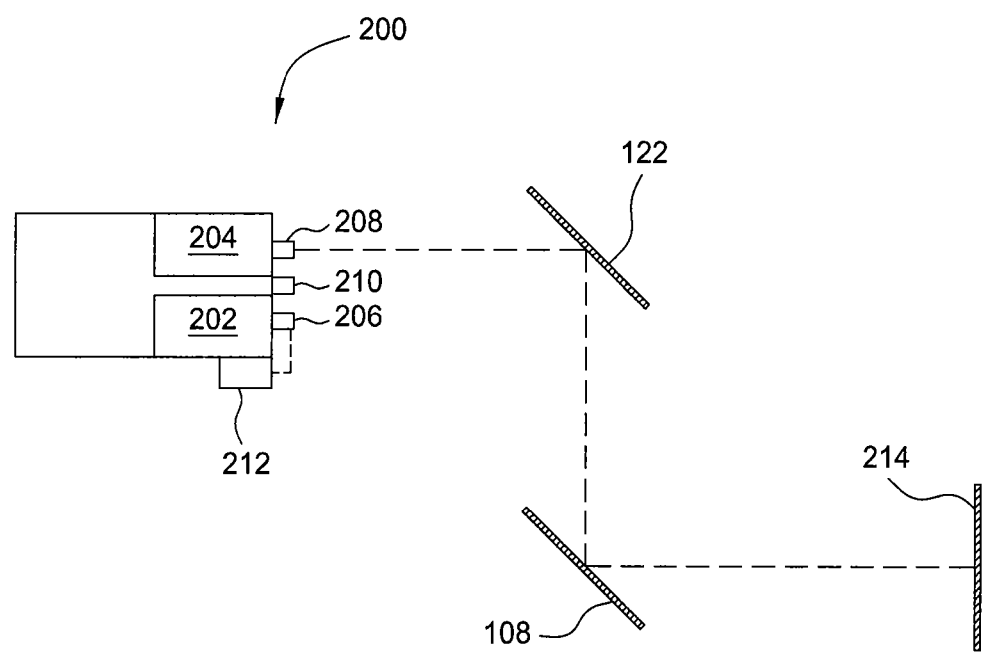
FIG. 2 is a schematic view of a laser apparatus according to another embodiment.

Precision may be enhanced in some embodiments by providing incremental positioning adjustment, rotational adjustment, and focus adjustment for the radiation source. FIG. 2 is a schematic view of a laser apparatus 200 incorporating an embodiment of a focus adjustment apparatus. The laser apparatus 200 is shown in relationship to the beam steering mirror 122 and the beam capture mirror 108 in a hypothetical orientation with respect to a substrate 214. The apparatus 200 comprises a laser source 202, which may be a plurality of lasers optically combined in any desired way, that emits a beam of laser radiation through a variable focus lens 206 in communication with an actuator 212 that adjusts the focus of the variable focus lens 206.

A variable focus lens useful for most embodiments will be fast to adjust, and will generally be thermally resistant. In one embodiment, a liquid cell variable focus lens having conduits for flowing the liquid through the lens may be used. In another embodiment, the variable focus lens may incorporate channels or conduits for flowing cooling fluid through the lens outside the liquid cell. In other embodiments, a liquid crystal lens may be used.

The actuator 212 may be controlled by a controller such as the controller 106 of FIGS. 1A and 1B. The controller may receive a signal representing focal length from a detector 210 configured to detect a flash or beam of radiation emitted from an emitter 204. The emitter 204 may be a laser or other source configured to emit radiation distinguishable by the detector 210. The emitter 204 emits a beam or flash through an aperture 208 along substantially the same optical path that the laser radiation follows from the variable focus lens 206 to the substrate 214. Reflected light from the substrate 214 is detected by the detector 210. The controller registers the optical path length and adjusts the variable focus lens 206 through the actuator 212. The proximity of the detector 210 to the aperture 208 is minimized to ensure the best precision in automated focusing of the variable focus lens 206.

The detector 210 may be a photon detector of any convenient type, including a camera. Types of photon detectors that may be used include a CCD matrix and a photodiode array. The detector 210 may additionally be a light intensity uniformity detector in some embodiments.

In alternate embodiments, the substrate support may comprise a precision rotator mounted on a precision x-y stage to enable x-y and rotational motion of a substrate disposed on the support. Adding the x-y positioning may improve processing throughput in some embodiments by enabling gross positioning by the x-y stage and fine positioning by the precision optics described herein. In another alternate embodiment, beam positioning and focus may be enhanced using an imaging device to view the optical path of the radiation beam through the aperture or final optical element of the radiation source 110. A CCD matrix may be incorporated with the radiation source 110, for example, to collect radiation reflected from the substrate along the optical pathway. The controller 106 may use data from the CCD matrix to generate control signals for any of the actuated devices described herein to improve positioning and focus of the beam.

Figure 3:
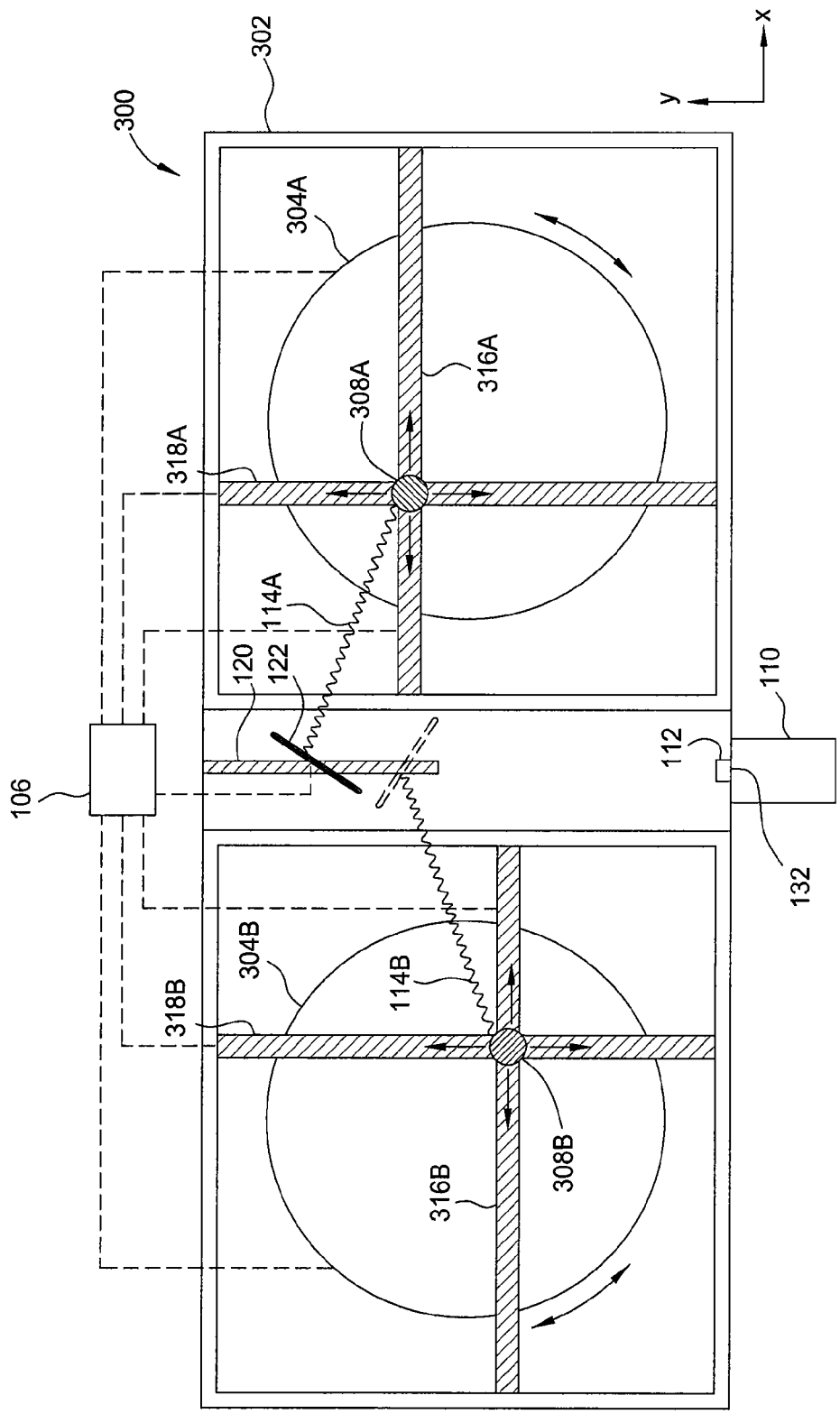
FIG. 3 is a schematic top view of a thermal processing apparatus according to another embodiment.

FIG. 3 is a schematic top view of a thermal processing apparatus 300 according to another embodiment. The apparatus 300 features many of the same components described in connection with FIGS. 1A and 1B above. The apparatus 300 has an enclosure 302 with a first rotatable substrate support 304A and a second rotatable substrate support 304B. Each substrate support may hold a substrate for processing. The radiation source 110 is used to process two substrates concurrently or sequentially by rotating the beam steering mirror 122 to direct the beam over the first substrate support 304A, as in beam 114A, or over the second substrate support 304B, as in beam 114B shown reflecting from phantom mirror 122. Each substrate support has an respective beam location assembly with respective beam capture mirrors 308A and 308B positioned using respective linear guides 316A/B and 318A/B. In such an apparatus, the beam steering mirror 122 may be rotated to direct the beam over the first and second substrate supports 304A/B alternately, thus processing substrates concurrently, or substrates may be processed sequentially, with one processing station actively processing while the other loads and unloads substrates.

In other embodiments, a plurality of beam capture mirrors and beam steering mirrors may be used with a single substrate support to address target locations at all points on a substrate without rotating the substrate. In one exemplary embodiment, a first beam steering mirror may be used with a first beam capture mirror to cover target locations over one-half of the substrate, moving as described above to maintain a first constant path length. The first beam steering mirror may then be parked in a position to steer the beam to a second beam steering mirror that moves with a second beam capture mirror to cover the remaining target locations at a second constant path length different from the first constant path length.

Embodiments disclosed herein also provide a method of targeting a beam of laser radiation at a location on a surface. The method comprises staging the target location by rotating the surface to an orientation in which the target location is accessible to a beam location optical assembly and locating a beam capture mirror over the target location. The beam capture mirror will reflect a beam of laser radiation from a source to the target location.

In one embodiment, the optical path length of the radiation beam is kept substantially constant for all target locations on the surface. The source location for the beam impinging on the beam capture mirror is identified by determining a reflection point of a beam steering mirror such that the optical path length of the beam reflecting from the beam steering mirror and the beam capture mirror to the target location is substantially equal to a target optical path length. The beam is directed toward the beam steering mirror from a fixed point, so the optical path length depends only on the position of the beam steering mirror, the beam capture mirror, and the location of the target. The beam steering mirror is moved to the identified reflection point, and the two mirrors rotated as needed to align in optical communication. A controller may be used to synchronize movement of the various elements concurrently to improve targeting speed.

To improve precision in targeting, various venire adjustments may be made. For example, the fixed point source of the beam may be adjusted after detecting the accuracy of the initial positioning. If maintaining a particular focal length is desired, the length of the optical path may be detected using any convenient detector, such as any of the methods described herein, and the focus may be adjusted using a variable focus lens in communication with a controller. Finally, if the beam has a desired rotational orientation, that orientation may be adjusted precisely by providing a rotatable aperture under the control of a controller.

In other embodiments, a lens may be used as the final adjustment of the beam before it reaches the target location. The lens may be a position adjustment lens only, such as a flat prism inclined at an angle to the direction of propagation of the beam, or the lens may be an optically active lens, such as a projection lens. The lens or prism may be moved over a target location, receive a beam of radiation from a source such as any of the mirrors described herein, and direct the beam precisely to the target location. The lens or prism may be positioned as described herein, and may be rotated to achieve a needed orientation.

Figure 4:
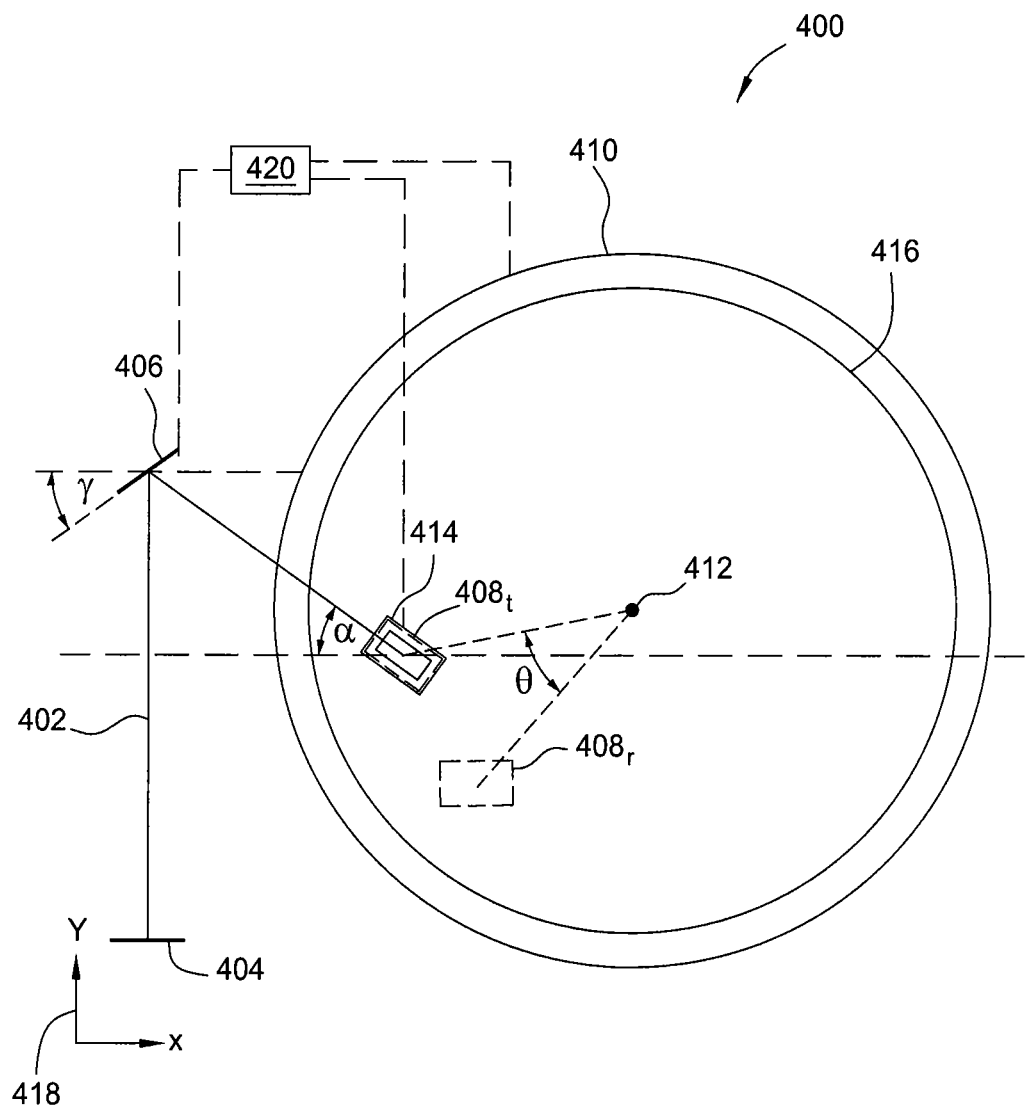
FIG. 4 is a schematic view of an apparatus for laser treatment of a substrate according to another embodiment.

FIG. 4 is a schematic view of an apparatus 400 for laser treatment of a substrate according to another embodiment. A laser beam 402 has a starting point 404, which may be an entry aperture into a chamber or merely a defined starting point of the laser beam with respect to the apparatus. The beam 402 reflects from a first mirror 406 toward a second mirror 414, which directs the beam to a die 408 on the surface of a substrate 416 disposed on a rotatable substrate support 410. Because the substrate 416 is rotated during processing, each die 408 has two relevant positions, a reference position $408_r$, for example the position of the die 408 before processing, and a target position $408_t$, the position of the die 408 during processing. The substrate 416 and the substrate support 410 each have a center 412.

In the embodiment of FIG. 4, a rotational position of the substrate support 410 is determined, along with a linear position and rotation of the first mirror 406 and a rotation of the second mirror 414, such that the laser beam 402 travels a constant distance from the beam entry point 404 to the second mirror 414. Additionally, the die 408 is aligned with the cross-sectional shape of the laser beam 402, engineered to match the shape of the die 408. Alignment of the die 408 with the beam 402 ensures the die 408 is uniformly irradiated by photonic energy over its entire area. The beam 402 may be shaped, in some embodiments, by passing through a beam cutter (not shown) designed to render a beam with a selected cross-sectional shape, such as rectangular. In some embodiments, the beam cutter is located at the beam entry point 404. In the embodiment of FIG. 4, the beam cutter is not moved or rotated, other than making fine alignment and/or focus and sizing adjustments, so the beam 402 arrives at the substrate 416 aligned along a certain axis, and the die 408 is rotated to align along that same axis.

Subject to the configuration described above, the rotation position of the substrate support 410 is determined as follows. With the beam 402 travelling parallel to the substrate surface from the beam entry point 404 to the second mirror 414, define a Cartesian coordinate plane 418 parallel to the substrate surface through the beam center. Calculations are simplified if the coordinate plane 418 is defined such that the x and y axes are parallel to the sides of the die 408 in the reference position $408_r$. Let $(x_s,y_s)$ be the coordinate position of the center of the beam at the beam entry point 404. Let $(x_1,y_1)$ be the target position of the center of the first mirror 406. Let $(x_c,y_c)$ be the center 412 of rotation of the substrate support 410. Let $(x_2,y_2)$ be the position of the center of the die 408 at the target position $408_t$. Let $(x_0,y_0)$ be the position of the center of the die 408 at the reference position $408_r$. The substrate 416 may be oriented to a reference position in which the die 408 is in the reference position $408_r$ by rotation prior to processing. Alternately, an offset may be detected between the orientation of the substrate and the reference orientation.

The position $(x_2,y_2)$ is calculated such that the sum of the distances from $(x_s,y_s)$ to $(x_1,y_1)$ and $(x_1,y_1)$ to $(x_2,y_2)$ is a constant and such that the sides of the die 408 at the target position $408_t$ are aligned with the rectangular cross-sectional shape of the laser beam 402. Let the constant beam length be denoted BL. A rotation angle θ for the substrate 416 to move the die 408 from the reference position $408_r$ to the target position $408_t$ is calculated as follows:

$$\theta = \arcsin((B^2 - 1)(B^2 + 1)),$$

where $$B = \frac{(BL - x_0 + x_c + y_s)}{(x_c - x_s + y_0 - y_c)}$$

The position $(x_2,y_2)$ may be calculated from the position $(x_0,y_0)$ by simple transformation from polar to Cartesian coordinates. If the substrate was not physically oriented at the reference orientation, the detected offset angle may be added or subtracted, as appropriate, to the rotation angle θ prior to determining the position $(x_2,y_2)$.

The second mirror 414 is moved to the position $(x_2,y_2)$ by an x-y positioner (as in FIG. 1A). With $x_1$, the x-position of the first mirror 406, constant, $y_1$ is calculated as follows:

$$y_1 = y_2 + (x_2 - x_s)\tan\theta.$$

The first mirror 406 is moved to position (x$_1$,y$_1$) by a linear positioner.

The second mirror 414 is held at a constant 45° angle with respect to the x-y plane, and is rotated about an axis perpendicular to the x-y plane by a rotational actuator to engage the beam reflected from the first mirror 406. The rotation angle α of the second mirror 414 with respect to the x-axis is the same as the angle θ. The first mirror 406 is held at a constant perpendicular orientation with respect to the x-y plane and rotated about an axis perpendicular to the x-y plane by a rotational actuator to reflect the beam 402 toward the second mirror 414. The rotation angle γ of the first mirror 406 with respect to the x-axis is given by $$\gamma = \frac{\pi}{4} - \frac{\theta}{2}$$

Positioning the substrate and the mirrors according to the method described above ensures the optical path length of the beam remains constant for all processing locations on a substrate. A controller 420 may be coupled to the mirrors 406 and 414, and to the substrate support 410 to accomplish the motions determined by the equations above. The controller may be configured with software designed to perform the above calculations and send control signals to actuators that move the mirrors 406 and 414 and the substrate support 410 based on the calculated positions.

The substrate support 410 is generally rotated by a precision rotational actuator with a certain defined precision. The imprecision in rotational position imparted by the actuator may be translated into a positioning error of up to about 40 μm in a 300 mm wafer embodiment. Such errors may be corrected, in one embodiment, by finely adjusting the position of the beam shaping aperture or beam cutter described above. If the aperture is located at the beam entry point 404, the aperture may be rotated or moved laterally in two directions to correct for fine positioning errors. Piezoactuators may be used for such fine adjustment. Errors in positioning the substrate may be detected and measured using photonic detectors such as cameras, CCD matrices, or photodiode arrays.

While the foregoing is directed to embodiments of the invention, other and further embodiments of the invention may be devised without departing from the basic scope thereof.

What is claimed is:

1. An apparatus for thermally treating a semiconductor substrate, comprising:
   a rotatable substrate support;
   a radiation source capable of producing a beam of radiation having substantially uniform intensity proximate the rotatable substrate support, the beam of radiation emerging from the radiation source at a beam entry point;
   a constant optical path length beam location assembly disposed in optical communication with the beam entry point, the constant optical path length beam location assembly having a plurality of movable optical components, wherein the movable optical components comprise a first mirror and a second mirror, the first mirror coupled to a first linear actuator and a first rotational actuator and the second mirror coupled to a second linear actuator and a second rotational actuator, wherein the first linear actuator moves the first mirror along a first direction and the second linear actuator moves the second mirror along the first direction; and
   a controller coupled to the substrate support and the constant optical path length beam location assembly, the controller adapted to position the optical components of the beam location assembly and a selected portion of a substrate on the substrate support such that the beam illuminates the selected portion and the optical path length for the beam is substantially the same for all portions of the substrate.

2. The apparatus of claim 1, wherein each rotational actuator rotates about an axis perpendicular to the first direction.

3. The apparatus of claim 2, wherein the second mirror also moves along a second direction perpendicular to the first direction, wherein each rotational actuator rotates about an axis perpendicular to the first direction and the second direction.

4. The apparatus of claim 3, wherein the radiation source comprises an actuated aperture coupled to the controller, and the controller is further adapted to position the aperture based on the position of the beam on the substrate.

5. The apparatus of claim 4, further comprising a beam position detector that sends a beam position signal to the controller.

6. The apparatus of claim 5, wherein the beam position detector comprises a camera.

7. The apparatus of claim 4, wherein the beam has a non-uniform cross-sectional shape, and the actuator of the final optical element of the light source rotates the aperture to orient the beam.

8. The apparatus of claim 6, wherein the camera detects an intensity profile of the beam, the final optical element comprises a variable focus lens, and the controller is further adapted to adjust the variable focus lens based on the intensity profile of the beam.

9. A method of targeting a beam of laser radiation at a target location on a surface, the method comprising:
   staging the target location by rotating the surface to an accessible orientation;
   locating a beam capture mirror over the target location;
   determining a reflection point of a beam steering mirror such that an optical path length of the beam reflecting from the beam steering mirror and the beam capture mirror to the target location is substantially equal to a target optical path length;
   moving the beam steering mirror in a first direction to the reflection point;
   rotating the beam steering mirror to direct the beam to the beam capture mirror;
   rotating the beam capture mirror to direct the beam to the target location; and
   moving the beam capture mirror as necessary in a second direction that is perpendicular to the first direction and a third direction that is parallel to the first direction.

10. The method of claim 9, further comprising detecting the accuracy of the beam targeting and improving the beam targeting by adjusting a beam origin point.

11. The method of claim 9, wherein staging the target location, locating the beam capture mirror over the target location, moving the beam steering mirror, and rotating the beam steering and beam capture mirrors is performed concurrently.

12. The method of claim 9, further comprising detecting the focus of the beam and improving the beam focus by adjusting a variable focus lens.

13. The method of claim 9, further comprising adjusting a beam orientation by rotating an aperture at a beam origin point.

* * * * *